No. 782,325. PATENTED FEB. 14, 1905.
S. H. COBB.
MEASURING APPARATUS.
APPLICATION FILED JAN. 14, 1904.

WITNESSES
Fred. E. Dorr
Edwin W. Sawyer

INVENTOR
Sylvanus H. Cobb

No. 782,325. Patented February 14, 1905.

UNITED STATES PATENT OFFICE.

SYLVANUS H. COBB, OF HYDEPARK, MASSACHUSETTS.

MEASURING APPARATUS.

SPECIFICATION forming part of Letters Patent No. 782,325, dated February 14, 1905.

Application filed January 14, 1904. Serial No. 188,988.

*To all whom it may concern:*

Be it known that I, SYLVANUS H. COBB, a citizen of the United States, residing at Hydepark, in the county of Norfolk and State of Massachusetts, have invented a new and useful Improvement in Measuring Apparatus, of which the following is a specification.

My invention relates to apparatus for measuring various substances, and is more particularly adapted for use in connection with culinary powders and the like.

To secure uniform and generally satisfactory results most reduced or pulverized materials used in cooking must be measured with considerable precision in amounts commonly expressed in spoonfuls and fractions thereof and varying from a portion of a saltspoon to a tablespoon, and it is highly desirable to preserve the bulk of the powder from which the measured quantity is taken from direct contact with the air to avoid such changes as loss of aroma or flavoring principle and lumping or caking together. The ordinary inconvenient and inaccurate method of measuring by the use of spoons of different sizes, often involving the dividing of a portion in the bowl and the roughly estimating of quantities, is familiar to every housewife, as is the progressive and often rapid deterioration of condiments by the evaporation of the essential oils, absorption of moisture, and various chemical changes.

To readily and accurately effect the measurement of such materials and at the same time to maintain them against exposure to the air are the chief objects of my invention, which consists in the various features hereinafter described and more particularly claimed.

Figures 1, 2:
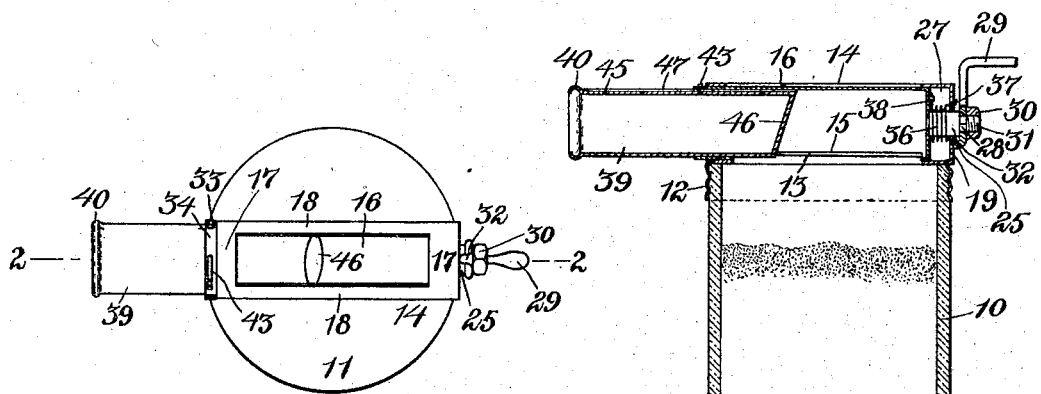
Figure 4:
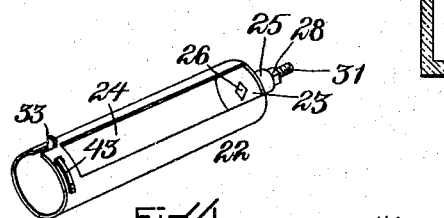
Figure 5:
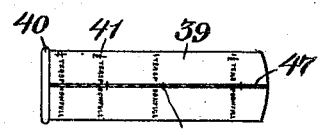
Figure 3:
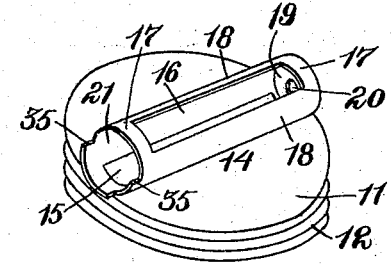
Figure 6:
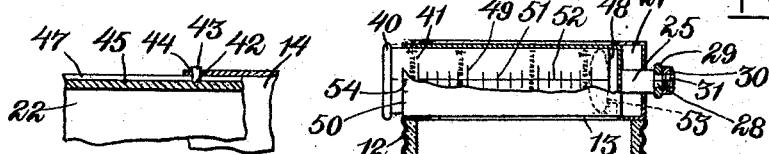
Figure 7:
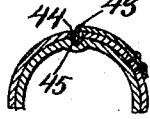
Figure 8:
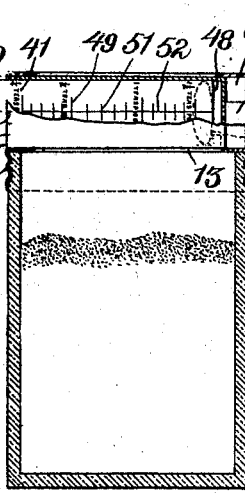

In the accompanying drawings, Figure 1 is a top plan view of one embodiment of my invention with the receiver in its discharging position. Fig. 2 is a central vertical longitudinal section therethrough on the line 2 2 of Fig. 1 with the receiver in its opposite or charging position. Fig. 3 is a perspective view of the cap and attached casing. Fig. 4 is a similar view of the receiver. Fig. 5 is a top plan view of the adjusting member. Figs. 6 and 7 are enlarged sectional details of the index projection and coacting depressions, and Fig. 8 is a central vertical longitudinal section through another form of my improved measuring apparatus.

Similar characters indicate like parts throughout the several figures of the drawings.

The numeral 10 designates some such suitable receptacle, as a jar, adapted to contain more or less finely divided material, said jar being provided with a cap 11 as a closure, conveniently secured thereto by a threaded flange 12. This cap, the flat top of which forms a wall of the receptacle, has at its upper surface an opening 13, preferably as an elongated slot extending from side to side. In this slot is seated a casing 14, here shown as a cylinder of substantially the same length as the diameter of the cap and provided with diametrically opposite openings 15 16, extending for but a portion of its length, leaving a section 17 of circumferentially-continuous casing-wall at each end. The width of these openings is preferably such that they each occupy substantially ninety degrees of the periphery of the casing, leaving between them unbroken walls 18 18, also about ninety degrees in extent. The end of the casing is preferably closed by a head 19, through which is a central opening 20, while the opposite end at 21 is unobstructed. This casing has its opening 15 registering with the slot in the cap and may be retained in place by soldering or otherwise securing it thereto. Operating within the casing is a measuring-receiver 22 of cylindrical form, closely fitting the interior of the casing and preferably elongated to extend from the edge of the casing-openings adjacent to the head to the opposite end. This receiver, as illustrated, is closed at its inner end by a head 23 and is open at its outer end and has at its side an opening 24, which preferably is of approximately the same dimensions as the casing-openings 15 and 16, so that when in communication they may be made to register, except that the opening 24 should be somewhat less wide than the casing-walls at 18. This, while not materially decreasing the opening from the receptacle into the chamber, absolutely prevents communication existing through said chamber between the openings 15 and 16 and between the interior of the receptacle and the outside air. The casing is preferably of somewhat heavier material than the other portions of the apparatus, resisting crushing and distortion and serving as a protective covering for the elements within it. Secured to the receiver is a spindle 25, conveniently through a reduced squared end 26, fixed in a similar opening in the receiver-head by soldering, upsetting, or the like. This spindle extends through a space or chamber 27 left between the casing and receiver-heads and through the opening 20, a portion outside the casing being shown as squared at 28 to receive an operating member or crank 29 for rotating the receiver, which may be secured in place by a nut 30, operating upon a threaded end 31 of the spindle. The crank is conveniently formed from a single piece of metal and has adjacent to the spindle an inwardly-turned end 32, which furnishes contact with the casing-head over a small surface and while offering but little resistance to rotation holds the receiver from moving outwardly in the casing. The range of rotary movement of the receiver will be from registration of its opening 24 with the casing-opening 15 to registration with the opposite opening 16, and to control this a stop device is provided. This, as here illustrated, consists of a projection 33, formed by an upwardly-turned lip upon the receiver, which operates in a space 34, where a portion at the end of the casing is cut away, having at its extremities contact-faces 35 35, with which the projection coacts. The contact of the projection 33 with the end of the casing may also serve to limit the inward movement of the receiver, so that with the crank end 32 the ends of its opening 24 may be held in perfect alinement with the ends of the openings 15 16.

It is desirable that the receiver-opening should be normally in communication with the casing-openings 15, and to secure this a spring 36 may be provided, conveniently of spiral form and encircling the spindle within the chamber 27, one extremity of the spring being held against turning by extending into a hole at 37 in the casing-head, while at the other end it coacts with a projection or lug 38 upon the receiver-head. This spring exerts its tension to return the receiver-opening to communication with the lower casing-opening when they are not manually separated.

To close the open outer end of the receiver and serve to vary its capacity, an adjusting member or cylinder 39 is provided, longitudinally movable within the receiver and preferably fitting it closely enough to retain it against accidental displacement. The outer end of the member may have a flange 40 to be grasped by the operator. For the correct setting of the adjusting member the apparatus has a scale and index, the former being here shown as located upon the cylindrical surface of the adjusting member at 41 and graduated from one and one-half teaspoons to fractions of a teaspoon. The index consists of a beveled projection 42, which may be carried at the end of a leaf-spring 43, secured upon the receiver within the space 34 and having its point extending through a hole 44 in said receiver. This index projection coöperates with depressions 45 in the wall of the adjusting member at the proper points, into which it is forced by a spring and notifies the operator that a scale-division has been reached, tending to arrest the movement at each point, yet being easily disengaged by slight force exerted upon the member. The end 46 of the member 39, furnishing an adjustable wall of the receiver-chamber, approaches closely to the fixed or non-adjustable wall at 23. In the measurement of very small quantities of materials it may become difficult to readily fill and empty the chamber, and to obviate this the wall 46 or wall 23 may be outwardly inclined or diverge from the wall opposite the opening, thus forming a throat of increased area, which facilitates the movement of material therethrough. To retain this inclined wall 46 in its proper position, the point of the index projection 42 may lie in a continuous longitudinal groove 47 of somewhat less depth than the depressions 45, the side walls of this groove preventing the rotation of the adjusting member within the receiver without interfering with its longitudinal movement.

In use, the jar containing some of the material to be dispensed and the receiver being held by the spring with its opening in communication with the interior of said jar, the operator sets the adjusting member at such a point, by aid of the scale on the index, that the chamber in the receiver will have a capacity equal to the quantity of material it is desired to measure, and in doing this she also simultaneously varies the area of the entrance into said chamber in the same proportion. She then inverts the jar, causing the chamber to fill by gravity, and it is only further necessary to rotate the receiver by the crank through a half-turn, when the contents of the chamber will be discharged. Upon the release of the crank the spring returns the receiver to the initial position, when the apparatus presents a practically continuous surface, wholly excluding dust from the parts which must contact with the contents of the jar. If it is desired to inspect the charge within the receiver before emptying it in, the crank should be rotated through a quarter-turn only, in which position such charge will be cut off from both the openings 15 and 16. Then the jar may be brought into an upright position and a half-turn completed to expose the contents. It should be noted in this connection that on account of proportioning of the openings and wall-spaces it is impossible to either with intent or by accident open communication between the interior of the jar and the outer air, and therefore the contents are not only always effectually sealed by tightly-contacting surfaces, but there is furnished an automatic guard against withdrawing at each rotation a greater quantity than the capacity of the receiving-chamber. If the quantity to be measured happens to be more than the maximum capacity of the receiver—for example, in the present instance, a tablespoon—it is only necessary to discharge a proper plurality of smaller charges to make this up. If it is desired to clean the parts of the apparatus, the nut may be removed from the spindle, when the receiver may be withdrawn from the casing. Then upon drawing out the adjusting member all surfaces become easily accessible.

It is not necessary and may not always be desirable to employ in this apparatus all the features hereinbefore described, and in Fig. 8 there is illustrated a highly useful form of greater simplicity. In this modification of the apparatus the spring 36 is omitted, the receiver being manually returned to its initial position, and the end 48 of the adjusting member is made substantially parallel to the receiver-head. The index projection is also omitted, and instead of the depressions in the adjusting member it is provided with a scale formed by suitable transverse lines 49, which may be set by the end of the receiver at 50 as an index. Between the main divisions of the scale other lines 51 may be placed, conveniently dividing the sections into equal parts. This enables the operator to determine modifications of any measure which she may desire to make—as, for example, in securing fixed variations in the quantities used in a recipe. There is also preferably a longitudinal medial line 52 upon the scale by which the adjusting member may be maintained in the proper angular position to keep the scale in the most convenient place for adjustment or for the positioning of the inner end were this made inclined, as has previously been described and as indicated by the dotted lines at 53 in Fig. 8. The line 52 may be set by reference to an index-mark 54 upon the end of the receiver. Otherwise the apparatus may be constructed as in the other figures of the drawings; but it will be evident that many such modifications may be made without departing from the spirit of my invention.

It will be seen that my improved apparatus not only serves as a compact, readily-operated, and accurate measure for all such reduced material as baking-powder or its constituents, salt, spices, coffee, or tea, but that it also furnishes a convenient receptacle which will preserve its contents from the air from the time of introduction until the last is used, while in no wise interfering with freedom of access.

Having thus described my invention, I claim—

1. A measuring apparatus comprising three tubes located one within the other, two of which tubes are provided with openings for the reception and discharge of material and with adjacent heads in the outer of which is an opening to the third tube, furnishing a closure, a spindle carried by the inner head and projecting through the head-opening, and operating means upon the spindle.

2. A measuring apparatus comprising three tubes located one within the other, each of which has at one end a head the inner of which is inclined, two of said tubes being provided with openings for the reception and discharge of material, and means for bringing said openings into coaction.

3. The combination with a receptacle provided with an opening, of a movable receiver mounted upon the receptacle and having an opening which may communicate with the receptacle-opening, and a member movable within the receiver and having its inner end inclined from the receiver-opening.

4. The combination with a casing open at one end and provided at the opposite end with a head in which is an opening, of a measuring-receiver situated within the casing and open at the same end thereas, a spindle carried by the receiver and projecting through the opening in the head, an operating member upon the outer end of the spindle, and an adjusting member extending into the receiver through the open end.

5. The combination with a casing, of a measuring-receiver rotatable within the casing to receive and deliver at opposite sides thereof, and an adjusting member operable within the receiver and having its inner end inclined to the axis of the receiver.

6. The combination with a casing open at one end and having at the other end a contracted opening, of a measuring-receiver within the casing provided with an operating member extending through the contracted opening, an adjusting member extending into the receiver at the open end of the casing and provided with a scale having depressions, and a spring-actuated index projection carried by the receiver and coacting with the scale depressions.

7. The combination with a casing having openings in its sides and at one end and being provided at the opposite end with a head in which is an opening, of a measuring-receiver within the casing having an opening which may register with the casing-opening, a spindle carried by the receiver and projecting through the opening in the head, and a crank fixed to the outer end of the spindle and provided with an inwardly-turned end adapted to contact with the head of the cylinder.

8. The combination with a casing having openings in its sides and at one end and provided at the opposite end with a head in which is an opening, of a measuring-receiver within the casing having an opening which may register with the casing-opening, a spindle carried by the receiver and projecting through the opening in the head, a crank fixed to the outer end of the spindle and provided with an inwardly-turned end adapted to contact with the head of the cylinder, and a projection upon the receiver contacting with the casing at its open end.

9. The combination with a cap, of a casing mounted thereon, and rotatable and longitudinally-movable measuring devices located within the casing.

10. The combination with a cap having an elongated opening, of a casing extending transversely thereof and having an opening registering with the cap-opening, and measuring devices situated within the casing.

11. The combination with a cap having an elongated opening, of a casing mounted thereon and having an opening registering with the cap-opening, a rotatable measuring device surrounded by the casing, and an adjusting device movable within the measuring device across the opening.

12. The combination with a cap having an elongated opening, of a casing mounted thereon and having an opening registering with the cap-opening, a rotatable measuring device surrounded by the casing, and an adjusting device movable within the measuring device, one of said devices being provided with a scale.

13. A measuring-cover for receptacles comprising a cap having a threaded flange and a flat top provided with an opening, a casing mounted upon said flat top and having an opening communicating with that of the cap, and a measuring-receptacle operating within the casing.

14. A measuring-cover for receptacles comprising a cap provided with an elongated opening, a casing mounted upon the cap and having an opening communicating with that of the cap, a measuring-receptacle operating within the opening and being provided with an opening registerable with the cap-opening, and means for varying the capacity of the measuring-receptacle movable across the opening.

15. A measuring-cover for receptacles comprising a cap provided with a slot, a casing seated within the slot and having an opening registering therewith and an opposite opening, a measuring-cylinder rotatable within the casing and having an opening which may register with either casing-opening, and an adjusting-cylinder within the measuring-cylinder.

Signed at Boston, in the county of Suffolk and the State of Massachusetts, this 11th day of January, 1904.

SYLVANUS H. COBB.

Witnesses:
   Lena Obermeyer,
   Edwin W. Sawyer.